March 28, 1939. J. W. LOGAN, JR 2,151,925
ACCELERATION AND DECELERATION CONTROL EQUIPMENT
Filed June 19, 1936

INVENTOR
JOHN W. LOGAN, JR.
BY *Wm. M. Cady*
ATTORNEY

Patented Mar. 28, 1939

2,151,925

UNITED STATES PATENT OFFICE 2,151,925

ACCELERATION AND DECELERATION CONTROL EQUIPMENT

John W. Logan, Jr., Forest Hills, Pa., assignor to The Westinghouse Air Brake Company, Wilmerding, Pa., a corporation of Pennsylvania Application June 19, 1936, Serial No. 86,095

30 Claims. (Cl. 192—2)

My invention relates to an acceleration and deceleration control equipment for railway vehicles.

In my copending application for acceleration and deceleration control systems, filed June 19, 1936, Serial No. 86,094 and assigned to the same assignee as this application, I disclose and claim a pneumatically controlled system for electric motors and fluid pressure brakes for railroad vehicles in which the propulsion and braking of the vehicle is controlled by a train line pipe, variations in the pressure therein above or below a predetermined value effecting the supply of power to the several motors or the application of the brakes on a plurality of motoring and braking units. In said system an inertia responsive controller is employed to determine the permitted rate of acceleration or deceleration of the vehicle and to effect the application of dynamic brakes prior to application of fluid pressure brakes.

In the present acceleration and deceleration control system I employ an electric train line control circuit operating self-lapping magnet valve devices on the several local train units for controlling the pressures in local pneumatic control pipes associated with the several train units to control the operation of the motors and to effect the application of the dynamic brakes and of the fluid pressure brakes in accordance with variations in the voltage of the train line circuit from a predetermined value. In the system disclosed and claimed in this application the degree of braking is limited by the dynamic braking current and the fluid pressure brakes are applied as the dynamic braking current falls below a predetermined value, while the controller is in a brake applying position.

It is an object of my invention to provide control equipment for railway vehicles wherein a single control handle controls both the braking and propulsion of the vehicle and determines the permitted acceleration and braking of the vehicle in accordance with the position of the control handle.

It is a further object of my invention to provide braking equipment for railway vehicles in which a plurality of braking means are provided that are controlled from the common brake controlling device in accordance with the desired degree of braking.

It is a further object of my invention to provide a braking equipment employing a fluid pressure brake and an electric brake, and in which the braking force of one brake is withheld as long as the braking force of the other is capable of producing the desired braking.

It is a further object of my invention to provide control equipment for railway vehicles for controlling both the propulsion and braking of vehicles upon a variation in the voltage in an electric train circuit from a desired value.

Other objects and advantages of my invention will be apparent from the following description taken in connection with the accompanying drawing, in which the single figure is a diagrammatic view of apparatus and circuits illustrating one preferred embodiment of the invention.

Figure 1:
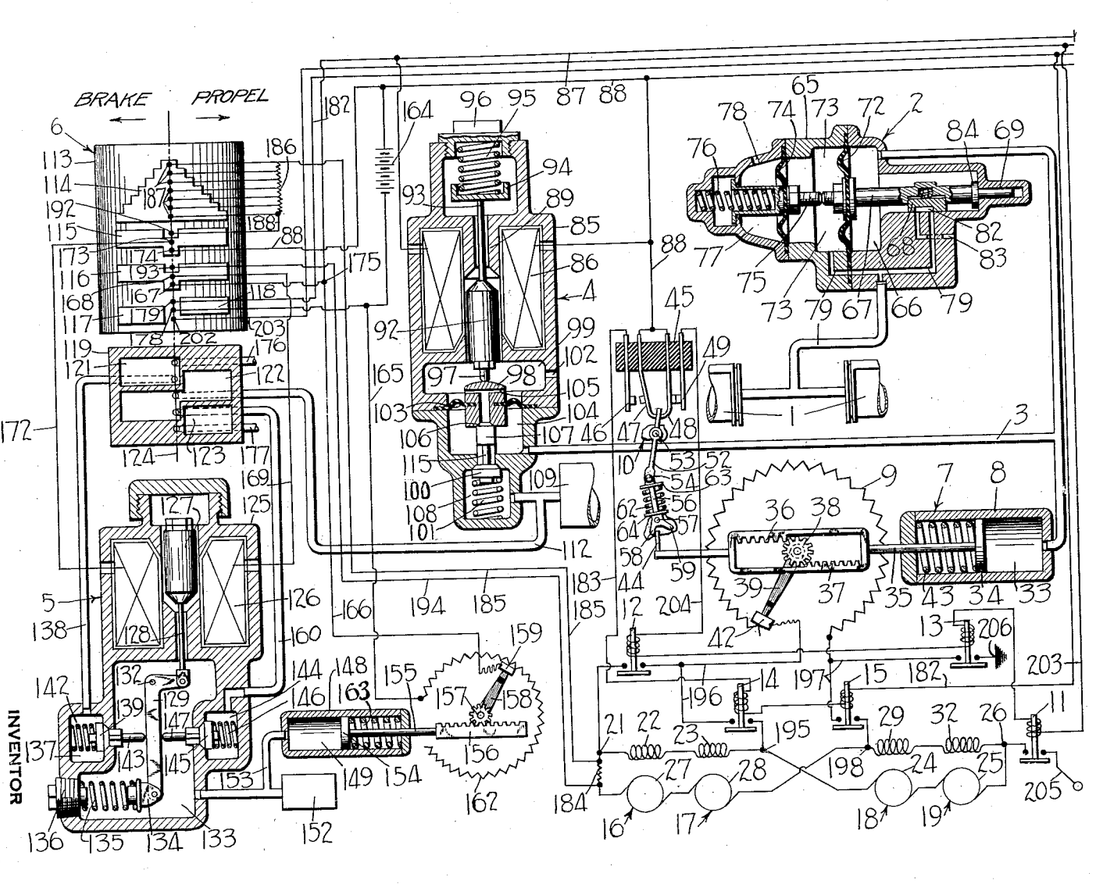

Referring to the drawing, a train may include a plurality of train units each comprising fluid pressure braking means having brake cylinders, the braking forces of which are controlled by a differential valve device 2 in accordance with the pressure in a local control pipe 3 associated with each braking unit. The pressure in each local control pipe is controlled by a self-lapping magnet valve device 4, provided for each unit, in accordance with the operation of an electropneumatic device 5 and a manually operable controller 6 at the head end of the train. A pressure operated controller 7 is provided on each train unit comprising a cylinder 8, a rheostat resistor 9 and a toggle switch 10 for controlling power contactors 11, 12 and 13 and dynamic braking contactors 14 and 15, which govern circuits from the motors 16, 17, 18 and 19 of one propulsion and braking unit of the train.

The motors 16, 17, 18 and 19 are connected in series parallel relation, one circuit extending from the junction point 21 through field windings 22 and 23 of motors 16 and 17, respectively, and armature windings 24 and 25 of motors 18 and 19, respectively, to the junction point 26, and the other circuit extending from the junction point 21 through the armature windings 27 and 28 of the motors 16 and 17, respectively, and through field windings 29 and 32 of the motors 18 and 19, respectively, to the junction point 26.

The cylinder 8 provides a piston chamber 33 that is in constant communication with control pipe 3, and which contains a piston 34 having a stem 35 providing racks 36 and 37 on opposite sides of a bifurcated portion, the racks having teeth thereon for engaging teeth on a pinion 38 for actuating a rheostat arm 39, carrying a contact member 42 that engages contact members on the rheostat resistor 9 to vary the amount of resistance in the control circuit. A spring 43 is provided about the stem 35 within the cylinder 8, one end thereof engaging the piston 34 and the other end engaging the end of the cylinder for biasing the piston 34 against the pressure in the piston chamber 33. A lug 44 is provided on the outer end of the stem 35 for actuating the toggle switch 10, which comprises an insulating block 45 carrying spring pressed contact members 46, 47, 48, and 49, the contact members 47 and 48 being actuated by the lever 52 pivoted at 53, the lower bifurcated end of which is pivotally connected by a pin 54 to a collar or crosshead 63 that is slidably positioned about the upper end of a lever 56 that is pivoted on a pin 57 and provided with operating fingers 58 and 59 adapted to be engaged by the lug 44. A spring 62 is provided about the lever 56 the upper end of which engages the crosshead 63 that slides on the lever 56 and the lower end of which engages a collar 64 on the lever 56 for urging the switch levers 52 and 56 to one of two circuit closing positions in a well known manner upon movement from one side to the other of a straight line connecting the pivot pins 53 and 57.

The differential relay valve device 2 comprises a casing 65 having a chamber 66 that is in constant communication with the control pipe 3 and that contains a slide valve 68 adapted to be shifted on an associated valve seat by a valve stem 67, one end of which is slidable within a bore 69 in the casing and the other end of which is attached to a diaphragm 72 forming one wall of the chamber 66. Formed within the casing 65 between the diaphragm 72 and another diaphragm 74, axially spaced from the diaphragm 72, is a chamber 73. Fixed at the center of the diaphragm 74 is a stem 75 that engages the end of the stem 67 within the chamber 73 on one side of diaphragm 74 and extends into a chamber 77 formed in the casing on the opposite side of the diaphragm 74. A spring 76, one end of which is positioned in a recess in the stem 75 within the chamber 77 and the other end of which is retained within a recess in the casing 65, yieldingly urges the stem 75 into contact with the end of the stem 67.

The chamber 77 to the left of the diaphragm 74 is in constant communication with the atmosphere through a port 78. The chamber 73 is, in the illustrated position of the slide valve 68, in communication with the atmosphere through brake cylinder passage 79, cavity 82 in the slide valve 68, and exhaust port 83. The spring 76 normally forces the stem 67 and the slide valve 68 to their illustrated positions, the collar 84 on stem 67 engaging a shoulder on the casing 65 to limit the movement toward the right.

The self-lapping magnet valve device 4 comprises a casing 85 containing a winding 86 that is constantly connected to train line conductors 87 and 88, and provided with a core having a stationary portion 89 and a movable portion 92 having a stem 93 extending upwardly through a bore in the stationary portion 89. The stem 93 terminates in a collar 94 at its upper end for engaging one end of a spring 95, the other end of which is positioned in a recess in a cap nut 96, that is positioned within an opening in the top of the casing. The lower end of the movable core 92 terminates in a stem 97 adapted to engage a movable member 98 within an exhaust chamber 99 that is in constant open communication with the atmosphere through exhaust port 102. The movable member 98 is connected to a diaphragm 103 that separates the chamber 99 from a chamber 104 contained within the casing, and that is in constant communication with the control pipe 3. A passage 105 is provided within the movable member 98 leading from the exhaust chamber 99 to a release valve seat 106 that accommodates a release valve 107 within the chamber 104.

A valve chamber 108 that is in constant communication with the supply reservoir 109 through supply reservoir pipe 112 is also provided in the casing 85 and contains an admission valve 100 that is urged towards its seat by a spring 101 contained within the chamber 108.

The magnet valve device 4 and apparatus controlled thereby are duplicated on each propulsion and braking unit of the train, and controlled in accordance with the voltage impressed on the train line conductors 87 and 88, in accordance with the operation of the electropneumatic device 5 and the controller 6.

The controller 6 comprises a drum 113 having conducting segments 114, 115, 116, 117 and 118 thereon, and a rotary valve 119, that is actuated in accordance with the movement of the drum 113, and which is provided with cavities 121, 122 and 123. Several contact members that are adapted to cooperate with the drum segments and several ports that are adapted to cooperate with the valve cavities are shown along the dot and dash line 124.

The electropneumatic device 5 comprises a casing 125 containing a winding 126 for actuating an armature 127 having a stem 128 that extends within a chamber 133 in the casing and is connected to one end of a bell crank lever 129 mounted on a pivot pin 132. The lower end of the bell crank lever 129 is connected to an abutment member 134 for engaging one end of a spring 135 and the other end of which engages an adjusting nut 136 screw-threadedly attached within a bore in the casing.

The casing 125 also contains a valve chamber 137 that is in open communication with pipe 138 and contains a valve 139 normally urged to its seat by a spring 142 and which is provided with a stem 143 extending through a bore in the casing wall into the chamber 133, and is adapted to engage the vertical portion of the bell crank lever 129. The casing also provides a valve chamber 144 containing a valve 145 that is urged toward its seat by a spring 146 and is provided with a valve stem 147 that extends through a bore into the chamber 133 and engages the side of the vertical portion of the bell crank lever 129 opposite the stem 143.

A pressure operated rheostat is provided comprising a cylinder casing 148 containing a piston chamber 149, that is in constant open communication with a volume reservoir 152 and with the chamber 133 through pipe 153, and which contains a piston 154 having a stem 155 connected to a rack 156 provided with teeth for engaging cooperating teeth on a pinion 157 for actuating an arm 158 of the rheostat device carrying a contact member 159 on the end thereof for varying the resistance of a resistor 162.

When the controller 6 is in its illustrated or brake releasing and motor idling position, the electropneumatic device 5 operates as a voltage regulator to maintain a predetermined voltage of say 65 volts between the train line conductors 87 and 88, the valve 139 operating as an exhaust valve and the valve 145 as an admission valve. The particular voltage is determined by the adjustment of the spring 135 which opposes the movement of the armature plunger 127.

If the voltage on the winding 126 of the electropneumatic device 5 is below the predetermined value of 65 volts, the force of the spring 135 will force the vertical portion of the bell crank lever 129 toward the right against the downward force of the armature 127 and unseat the valve 145, permitting the flow of fluid under pressure from the supply reservoir 109 through supply pipe 112, the cavity 122 in the rotary valve 119, pipe 163 to the valve chamber 144, past the unseated valve 145 to the pressure chamber 133 and to the volume reservoir 152 and piston chamber 149 to force the piston 154 toward the right against the bias of the spring 163 and cause a counter-clockwise movement of the contact member 159 to decrease the amount of the resistor 162 that is in circuit with the winding 126.

The energizing circuit for the winding 126 of the electropneumatic device 5 extends from the positive terminal of the battery 164 through conductor 165, the rheostat resistor 162, contact member 159, conductor 166, controller contact member 167, conducting segment 116, contact member 168, conductor 169, the winding 126, conductor 172, controller contact member 173, conducting segment 115, contact member 174 to the train line conductor 88 that is connected to the negative terminal of the battery 164. The train line conductor 87 is connected to conductor 166 at the junction point 175 so that the same voltage is present between the train line conductors 87 and 88 as across the winding 126 of the electropneumatic device. As the pressure within the piston chamber 149 increases, the rheostat contact member 159 continues to move in a counter-clockwise direction, decreasing the amount of the resistor 162 that is in circuit with the winding 126, increasing its energization and causing a greater downward force on the armature 127 until its force has increased sufficiently to actuate the bell crank lever 129 in a clockwise direction against the bias of the spring 135 to permit the valve 145 to seat, and prevent the further supply of fluid under pressure from the supply reservoir 109 to the piston chamber 149.

If the energization of the winding 126 increases above the desired or floating voltage normally impressed between the train line conductors 87 and 88, the force of the armature 127 will be sufficiently increased to move the bell crank lever 129 in a clockwise direction an amount sufficient to cause the pressure against the stem 143 to force the valve 139 from its seat and to permit the flow of fluid under pressure from the piston chamber 149 and the pressure chamber 133 past the unseated valve 139, through pipe 138, valve cavity 121, and the exhaust pipe 176 to the atmosphere, thus decreasing the pressure in the piston chamber 149 and permitting the spring 163 to move the piston 154 and the rack 156 toward the left to effect a clockwise movement of the contact member 159 to increase the amount of the resistance 162 that is included in circuit with the train conductor 87. The energization of the winding 126 is thereby decreased, thus decreasing the downward force on the armature 127 until a balance exists between the torque caused by the downward force of the armature 127 and that caused by the force of the spring 135, under which condition both the valves 139 and 145 remain seated.

It will be clear from the above description that the voltage across the winding 126 of the electropneumatic device corresponds to the voltage across the train line conductors 87 and 88, and that the electropneumatic device operates when the brake controller is in its release or idling position as a voltage regulator to maintain a predetermined desired voltage on the train line conductors 87 and 88, such, for example, as 65 volts. It will further be appreciated that each train propulsion and braking unit is provided with fluid compressor equipment, a supply reservoir 109, and a self-lapping magnet valve device 4 for controlling the equipment on that unit.

The self-lapping magnet valve device 4 operates to maintain a pressure within the control pipe 3 and within the chamber 66 of the differential relay device 2 and the piston chamber 33 of the pressure operated controller 7 that is determined by the voltage impressed on the winding 86 of the magnet valve device. As the voltage across the train line conductors 87 and 88 increases to the floating or neutral value of 65 volts, the upward force of the armature 92 increases, and opposes the downward force of the spring 95 until, at this neutral voltage, both the admission valve 100 and the exhaust valve 107 are seated, and the pressure in the diaphragm chamber 104 and in the control pipe 3 equals the desired value of say 28 pounds pressure. If the pressure in the control pipe 3 rises above the desired value the upward pressure on the under side of the diaphragm 103 moves the member 98 upwardly, thus raising the exhaust valve seat 106 from the exhaust valve 107 and permitting the release of fluid under pressure from the control pipe 3 to the atmosphere through passage 105, the exhaust chamber 99 and the exhaust port 102, until the pressure in the control pipe 3 and the diaphragm chamber 104 has decreased sufficiently that the downward force of the stem 97 on the movable member 98 is sufficient to seat the valve 107, and prevent further release of the fluid under pressure from the control pipe 3.

If the pressure in the control pipe 3 decreases below the desired value of 28 pounds while a voltage of 65 volts is being maintained between the train line conductors, the upward force on the diaphragm 103 decreases sufficiently to permit the stem 97 to force the movable member 98, the valve 107, the stem 115 and admission valve 100 downwardly against the bias of the spring 101, thus unseating the admission valve 100, and permitting the supply of fluid under pressure from the supply reservoir 109 past the unseated supply valve 100 to chamber 104 and the control pipe 3, until the pressure on the diaphragm 103 within the diaphragm chamber 104 has increased sufficiently to force the valve assembly upward to permit the seating of the admission valve 100 by the spring 101 to close communication between the supply reservoir 109 and the control pipe 3.

The neutral or floating pressure of 28 pounds in the control pipe 3 is sufficient to move the piston 34 and the piston stem 35 of the control device 7 against the force of the spring 43 to its mid position, so that the position of the rheostat arm 39 and of the contact member 42 carried thereby is the all-in position of the rheostat 9. The graduating spring 76 in the differential relay valve device 2 is so adjusted that it exerts a force on the stem that is sufficient to maintain the slide valve 68 in its illustrated position against the neutral or floating pressure of 28 pounds in the chamber 66.

*Operation*

If the operator wishes to apply the brakes, the controller 6 comprising the drum 113 and the rotary valve 119 is moved towards the left as viewed in the drawing, thus effecting communication from the supply reservoir 109 to the valve chamber 137 through supply pipe 112, cavity 122 in the rotary valve 119 and pipe 138, and also effecting communication from the valve chamber 144 to the atmosphere through pipe 160, cavity 123 in the rotary valve 119 and exhaust pipe 177. It will be appreciated that this movement of the rotary valve reverses the above described functions for the valves 139 and 145, the valve 139 although remaining seated now being the admission valve to control the supply of fluid under pressure from the supply reservoir 109 to the piston chamber 149 and the valve 145 now controlling the release of fluid under pressure therefrom to the atmosphere.

Movement of the controller drum 113 towards the left completes a circuit from the positive terminal of the battery 164 through conductor 165, the contact member 178, the conducting segment 118, contact member 179, conductor 182, the windings of the dynamic brake contactors 14 and 15, conductor 183, and upon operation of the toggle switch to cause engagement of the contact members 46 and 47 in the manner to be presently described, to train line conductor 88 and the negative terminal of the battery 164.

Movement of the controller drum 113 towards the left interrupts the circuit between the winding 126 of the electropneumatic device and the train line conductors 87 and 88 through contact segments 116 and 115 respectively, and completes a circuit from one terminal of a resistor 184 in the circuit of the motors constituting the head unit of the train, through conductor 185, and a portion of a resistor 186 and the contact segment 114 of the brake controller, depending upon the position of the drum 113 and the number of contact members 187 that are in engagement with the conducting segment 114, conductor 188, contact member 192, segment 115, contact member 173, conductor 172, the winding 126, conductor 169, contact member 168, conducting segment 116, contact member 193, and conductor 194 to the opposite end of the resistor 184 to impress a voltage on the winding 126 corresponding to the dynamic braking current supplied by the motors 16, 17, 18 and 19.

Upon the interruption of the circuit through the winding 126 occasioned by the above transfer of the connection of this winding from across the train line conductors 87 and 88 to its connection across the resistor 184 in the motor circuit, the downward pull of the winding on the armature 127 is decreased, thus permitting the spring 135 to force the lever 129 in a counterclockwise direction against the stem 147, forcing the valve 145 from its seat to effect the release of fluid under pressure from the piston chamber 149 to the atmosphere through pipe 160, cavity 123, and exhaust pipe 177, thus permitting the spring 163 to force the piston 154 and the rack 156 toward the left to effect movement of the rheostat arm 158 in a clockwise direction to increase the amount of the resistor 162 included in circuit with the train line conductor 87, and thereby decrease the voltage between the train line conductors 87 and 88. As the voltage across the train line conductors is thus decreased the energization of the winding 86 of the self-lapping valve devices 4 on the several train units are correspondingly reduced, thus decreasing the upward force of the armature 92 and permitting the spring 95 to force the armature downwardly to unseat the admission valve 100 and effect a further supply of fluid under pressure from the supply reservoir 109 past the unseated valve 100 to the control pipe 3 until the pressure within the diaphragm chamber 104 has built up sufficiently to cause the pressure on the diaphragm 103 to overcome the downward force of the stem 97 and permit the spring 101 to seat the valve 100.

This increasing pressure in the control pipe 3 causes the piston 34 and the piston stem 35 to be moved toward the left against the bias of the spring 43. Upon the initial movement of the stem 35 toward the left the lug 44 in the end thereof engages the finger 58 of the toggle switch 10 causing it to operate from its illustrated position to a position causing separation of the contact members 48 and 49 and engagement of the contact member 47 with the contact member 36, to complete a circuit from the positive terminal of the battery 164 through conductor 165, controller contact member 178, the conducting segment 118, contact member 179, conductor 182, to the windings of the dynamic braking contactors 15 and 14, conductor 183, through toggle switch contact members 46 and 47 and by train line conductor 88 to the negative terminal of the battery 164, thus energizing the contactors 14 and 15 and actuating them to their circuit closing positions. A dynamic braking circuit is thus completed from the junction point 195 of the series parallel loop of the motors 16, 17, 18 and 19, through the contact member of the contactor 14, conductor 196, rheostat, contact member 42, resistor 9, conductor 197, contact member of the contactor 15 to the junction point 198 and through the motor loop circuit to the junction point 195.

The movement of the piston 34 and of the stem 35 toward the left causes the teeth of the rack 37 to engage the teeth of the pinion 38 to actuate the contact member 42 in a clockwise direction to decrease the amount of the resistor 9 in the dynamic braking circuit, thus increasing the dynamic braking current and braking force. As the dynamic braking current increases, the energization of the winding 126 of the electropneumatic device 5 correspondingly increases.

It will be noted that portions of the resistor 186 are short circuited through contact members 187 and the conducting segment 114 of the brake controller 6, the amount of movement of the controller from its release position determining the amount of resistance 186 to be included in circuit with the winding 126, thus determining the amount of dynamic braking current through the resistor 184 that is necessary to produce a sufficient voltage drop across the resistor to energize the winding 126 to the extent necessary to balance the force of the spring 135. When a sufficient downward pull on the armature 127 is exerted the valve 145 seats and closes communication from the supply reservoir 109 to the piston chamber 149. The amount of dynamic braking is thus controlled by the position of the controller drum 113.

For any position of the controller drum 113, as the vehicle speed decreases the dynamic braking current from the motors 16, 17, 18 and 19 correspondingly decreases, thus decreasing the voltage across the resistor 184 and the winding 126 of the electropneumatitc device 5, and correspondingly the downward pull on the armature 127 in opposition to the force of the spring 135, thus permitting the spring 135 to actuate the lever 129 in a counterclockwise direction to again unseat the valve 145 and permit the further release of fluid under pressure from the piston chamber 149 to actuate the rheostat arm 158 in a direction to increase the dynamic braking current. It will be seen therefore that the electrophenumatic device 5 operates when the controller 6 is in a brake applying position as a regulator to regulate for a constant current in the dynamic braking circuit, the amount of that current depending upon the position of the controller drum 113.

As the rheostat arm 158 is actuated in a clockwise direction to decrease the voltage across the train line conductors 87 and 88, the energization of the winding 86 of each of the self-lapping magnet valve devices 4 are correspondingly reduced thus decreasing the upward force on the armature 92 and permitting the spring 95 to force the armature 92 and the stem 97 downwardly against the upward pressure of fluid in the chamber 104 against the diaphragm 103, to thus force the admission valve 100 from its seat and permit the further supply of fluid under pressure from the supply reservoir 109 past the unseated valve 100 to the control pipe 3 to increase the pressure therein and actuate the piston 34 and stem 35 further to the left against the bias of the spring 43, to actuate the rheostat arm 39 further in a clockwise direction to further decrease the amount of the resistor 9 included in the dynamic braking circuit.

As the voltage across the train line conductors 87 and 88 decreases from a floating value of 65 volts, corresponding to the release of the brake, to a value of, say 25 volts, by operation of the rheostat arm 158 in the manner above described, the pressure within the control pipe 3 is increased from a floating value of 28 pounds to a value of say 60 pounds, corresponding to the movement of the piston 34 to its extreme left position, and movement of the rheostat arm 39 from its illustrated position in a clockwise direction through its entire travel to cut all of the resistor 9 from the dynamic braking circuit. During this increase in control pipe pressure from 28 to 60 pounds, the pressure of the graduating spring 76 of the differential relay valve device 2 is sufficient to prevent the increase in pressure on the diaphragm 72 from moving the slide valve 68 from its illustrated position sufficiently to uncover the end of the passage 79 and permit the supply of fluid under pressure from the control pipe 3 through chamber 66 and passage and pipe 79 to the brake cylinders 1 and the intermediate chamber 73 in the differential relay valve device.

As the dynamic braking current fades due to diminishing train speed, after movement of the rheostat arm 39 through its entire range of movement, further decrease in the voltage of the train line circuit, and further increase in the pressure in the control pipe 3, causes a sufficient movement of the diaphragm 72 and the stem 67 of the differential relay valve device to uncover the end of the passage 79 in the valve seat and effect the supply of fluid under pressure from the control pipe 3 past the outer end of the slide valve 68 to the brake cylinders 1 and the chamber 73 of the differential relay valve device. As the pressure in the chamber 73 builds up, the force exerted thereby on the rear of the diaphragm 72 tending to move the stem 67 and the slide valve 68 to lap position is partially nullified by the reduction in the force of spring 76 due to the pressure against the diaphragm 74, therefore requiring a greater increase in pressure in the chamber 73 and in the brake cylinders 1 than the increase in pressure above sixty pounds per square inch in the chamber 66 to move the valve 68 to lap position.

In the illustrated embodiment of the invention, it is assumed that the ratio of the areas of the diaphragms 72 and 74 is such that, as the pressure in the chamber 66 builds up from 60 to 80 pounds the pressure within the chamber 73 and the brake cylinders will build up from zero to sixty pounds, the increase in brake cylinder pressure being proportional to the increase in pressure in the chamber 66 within the designated pressure range. Thus for each pound per square inch increase above sixty pounds per square inch pressure in chamber 66, a three pound per square inch increase of pressure is effected in chamber 73 and the brake cylinders 1. As the brake cylinder pressure and the pressure within the chambers 73 build up above a value corresponding to the indicated ratio for any given pressure in the chamber 66, the force of the diaphragm 72 will be sufficient to force the slide valve 68 to lap position to close communication from the chamber 66 to the brake cylinders 1 and to the chamber 73.

If the operator wishes to release the brakes the controller drum 113 and rotary valve 119 of the controller 6 are moved to their illustrated positions, thus again establishing communication between valve chamber 144 and supply reservoir 109 through pipe 160, valve cavity 122, and supply pipe 112, and again establishing communication between the valve chamber 137 and the atmosphere through pipe 138, cavity 121 in the rotary valve, and exhaust pipe 176. Upon movement of the drum 113 to its release position the circuit between the winding 126 and the resistor 184 is interrupted upon separation of the contact members 192 and 193 from the conducting segments 115 and 116, respectively, and the winding 126 is again connected to the train line conductors 87 and 88 upon engagement of the controller contact members 174 and 167 with the conducting segments 115 and 116, respectively. Since, when the controller is moved from a brake applying position to release position the voltage between the train line conductors is below the floating value of sixty-five volts, the magnetic pull upon the core 127 of the electropneumatic device 5 is insufficient to balance the force of the spring 135 and the lever 129 is moved in a counterclockwise direction against the valve stem 147 forcing the valve 145 from its seat to effect communication from the supply reservoir 109 through valve chamber 144 to the piston chamber 149 to again move the piston 154 and the rack 156 towards the right and effect a counter-clockwise movement of the contact member 159 to decrease the amount of resistance 162 in the train line circuit, thus increasing the voltage between the train line conductors 87 and 88 and correspondingly increasing the voltage across the winding 86 of the self-lapping valve devices 4. Upon this increase in voltage and in the energization of the windings 86 of the self-lapping magnet valve devices, the core 92 is pulled upwardly against the bias of the spring 95, thus decreasing the pressure on the movable member 98 and permitting it to be moved upwardly by the pressure in the diaphragm chamber 104 sufficiently to move the valve seat 106 from engagement with the release valve 107 to permit the release of fluid under pressure from the control pipe 3 to the atmosphere through the diaphragm chamber 104, passage 105, exhaust chamber 99, and exhaust port 102.

As the pressure in the control pipe 3 and in the chamber 66 in the differential relay valve device 2 is decreased, the combined force of the graduating spring 76 acting through the stem 75 against the valve stem 67 and the fluid pressure on the rear of the diaphragm 72 is sufficient to move the slide valve 68 to its illustrated position to effect the release of fluid under pressure from the brake cylinder 1 through brake cylinder pipe and passage 79, the cavity 82 in the slide valve 68, and the exhaust port 83, to release the fluid pressure brake. Upon the decrease in pressure in the control pipe 3 the pressure in the piston chamber 33 of the rheostat controller 7 is correspondingly decreased, thus permitting the spring 43 to move the piston 34 and the stem 35 toward the left from its extreme position to the illustrated or middle position, the teeth in the rack 37 engaging those in the pinion 38 to move the contact member 42 from the all-out position of the rheostat to the all-in or illustrated position. The toggle switch 10 will remain in the position in which it was last operated upon movement of the piston 34 and stem 35 to the middle position corresponding to a floating pressure of twenty-eight pounds in the control pipe 3, and a voltage of sixty-five volts between the train line conductors 87 and 88, as controlled by the electropneumatic device 5 acting as a voltage regulator in the manner above described. Also, upon return of the controller drum 113 to its release position, the separation of the conducting segment 118 from the contact members 178 and 179 interrupts the circuit above traced for energizing the windings of the dynamic braking contacts 14 and 15, thus deenergizing the contactors and permitting them to drop to their circuit interrupted or illustrated positions.

If the operator wishes to supply power to the motors 16, 17, 18 and 19 for propelling the vehicle, the controller 6 is operated in a direction to move the drum 113 and the rotary valve 119 toward the right as viewed in the drawing. This movement of the rotary valve 119 does not change any of the connections that maintain when the controller is in its release position. The movement of the controller drum 113 from its release and idling position however interrupts the connection between the winding 126 of the electropneumatic device 5 and the train line conductors 87 and 88 upon separation of the contact members 174 and 167 from the conducting segments 115 and 116, respectively, and connects the winding 126 to the resistor 184 in the motor circuit upon engagement of the contact members 192 and 193 with the conducting segments 115 and 116, respectively, in the same manner as above described for dynamic braking. Upon movement of the controller drum 113 toward the right, a circuit is completed from the positive terminal of the battery 164, through conductor 165, contact member 178, conducting segment 117, contact member 202, conductor 203, the windings of the propulsion contactors 11, 13 and 12, conductor 204, the contact members 49 and 48 of the toggle switch device 10, and train line conductor 88 to the negative terminal of the battery 164, thus energizing the contactors 11, 13 and 12 and actuating them to their circuit closing positions. A power circuit for driving the vehicle is thus completed from the trolley 205, through contactor 11 to the junction point 26, and from junction point 26 through one of the parallel circuits including the field windings 32 and 29, respectively, of motors 18 and 19, and the armature windings 28 and 27 of the motors 17 and 16, respectively, through the resistor 184 to the junction point 21, and also through the parallel circuit from junction point 26 through the armature windings 25 and 24 of motors 19 and 18, respectively, and field windings 23 and 22 of motors 17 and 19, respectively, to the junction point 21, and from the junction point 21 through the closed contactor 12, conductor 196, the rheostat contact member 42, resistor 9, conductor 197, the closed contactor 13, to ground at 206.

Upon movement of the controller from its release and idling position to a motoring position as above described and the transfer in the connection of the winding 126 of the electropneumatic device the voltage across the winding 126 temporarily drops, due to the absence of or the low value of current now flowing through resistor 184, thus decreasing the downward pull on the cord 127, permitting the spring 135 to force the lever 129 in a counter-clockwise direction about the pivot 132 against the valve stem 147 to force the valve 145 from its seat and permit the further supply of fluid under pressure from the supply reservoir 109 to the pressure chamber 133, the volume reservoir 152, and the piston chamber 149 to force the piston 154 and the stem 155 toward the right. The rack 156 thus actuates the pinion 157 and the rheostat arm 158 in a counter-clockwise direction and decreases the portion of the resistor 162 in circuit between the battery 164 and the train conductor 87 to increase the voltage between the train conductors 87 and 88. As the voltage between the train conductors 87 and 88 increases the energization of the windings 86 of each of the self-lapping magnet valve devices 4 correspondingly increases, thus increasing the upward pull of the core armature 92 against the bias of the spring 95 to decrease the downward pressure on the movable member 98 and permit the pressure in the chamber 104, acting upwardly against the diaphragm 103, to move the member 98 upwardly from engagement with the valve 107 and release fluid under pressure from the control pipe 3 through passage 105, chamber 99, and exhaust port 102, to decrease the pressure in the piston chamber 33 of the pressure operated device 7, thus permitting the piston 34 and the valve stem 35 to be moved toward the right by the bias of the spring 43. Upon movement of the stem 35 toward the right from its mid or illustrated position, if the toggle switch 10 is not in its illustrated position, it will be actuated to that position upon engagement of the finger 59 by the lug 44 on the end of the piston stem, thus completing the above traced circuit through the windings of the power contactors 11, 13, and 12 upon, either engagement of the toggle switch contactor members 48 and 49, or upon engagement of the controller and segment 117 with the contact members 178 and 202, depending upon which occurs last. Upon this movement of the piston 34 and stem 35 toward the right the teeth of the rack 36 will engage teeth of the pinion 38 to actuate the rheostat arm 39 in a clockwise direction to decrease the amount of the resistor 9 in series with the motor circuit. The pressure in the control pipe 3 and in the chamber 104 will continue to decrease until the pressure on the under side of the diaphragm 103 has been reduced sufficiently that the downward pressure of the stem 97 is sufficient to cause the member 98 to seat on the valve 107 and close communication from the chamber 104 to the atmosphere.

As the rheostat arm 39 moves in a clockwise direction from its illustrated position, decreasing the resistance in series with the motors 16, 17, 18, and 19, the flow of current will increase the voltage drop across the resistor 184 in the motor loop circuit and also across the winding 126 of the electropneumatic device 5, the ratio between these two voltages depending upon the position of the controller 6. The further the controller drum 113 is moved from its idling position the greater will be the number of contact members 187 that will be separated from the conducting segment 114 and consequently the larger number of sections of the resistor 186 there will be in series with the winding 126 and therefore the greater will be the voltage required across the resistor 184 to energize the winding 126 sufficiently to balance the force of the spring 135. When, for any position of the controller, the energization of the winding 126 has increased sufficiently to balance the force of the spring 135, the downward pull of the armature 127 on the lever 129 will actuate it sufficiently in a clockwise direction to relieve pressure on the stem 147, and permit the valve 145 to seat to close communication between the supply reservoir 109 and the piston chamber 149, to stop further movement of the rheostat arm 158. As the speed of the motors 16, 17, 18 and 19 increases, the generated counter-electromotive force will correspondingly increase, thus decreasing the current supplied to the motors through resistor 184 and decreasing the voltage thereacross, correspondingly decreasing the energization of the winding 126 and again permitting the counter-clockwise movement of the lever 129 to unseat the valve 145 to permit the further supply of fluid under pressure from the supply reservoir 109 to the piston chamber 149, and further movement of the piston 154, and rack 156, toward the right against the bias of the spring 163 to move the rheostat arm 158 in a counter-clockwise direction to further increase the voltage across the train conductors 87 and 88. The energization of the windings 86 of the self-lapping magnet valve devices 4 will be correspondingly increased to operate as before described, to decrease the pressure in the control pipe 3 and the piston chamber 33 to permit further movement of the piston 34 and of the rack 36 toward the right to actuate the rheostat arm 39 further in a clockwise direction to further decrease the resistance in circuit with the motors and correspondingly increase the motor power until the voltage across the resistor 184 is again sufficient to interrupt this action as previously described.

It will be understood from the above description that, when the controller 6 is in a motoring position, the electropneumatic device 5 operates as a current regulator to maintain a constant voltage drop across the resistor 184 in the loop circuit of the motors 16, 17, 18 and 19 and consequently to maintain a substantially constant accelerating current supplied to these motors, which will decrease when the motors approach full speed due to the increasing counter-electromotive force generated as the motor speed increases. As the regulator operates in the above indicated manner to increase the voltage between the train conductors 87 and 88 above the floating value of sixty-five volts to a maximum of 100 volts, the pressure in the control pipe 3 and in the piston chamber 33 will decrease from the floating pressure of twenty-eight pounds to a pressure of substantially five pounds, during which decrease in pressure the rheostat arm 39 will have moved through its entire range from its illustrated position to a position to exclude all of the resistor 9 from the motor circuit, in which position it will be maintained so long as the controller 6 is maintained in the motoring position. The rate of acceleration of the motors will depend upon the rate at which power is supplied to them during acceleration, which will be greater for the greater movement of the controller from its release or idling position. The further the movement of the controller from this release or idling position the less will be the amount of the resistor 186 between the source of voltage 184 and the winding 126, and, consequently, the less will be the voltage drop across the resistor 184 necessary to effect a predetermined energization of the winding 126. The electropneumatic device 5 will operate to regulate for a voltage of sixty-five volts across the winding 126, the voltage across the resistor 184 being equal thereto when all of the resistor 186 is excluded from the circuit, and corresponding to a higher value than the voltage across the winding 126 as determined by amount of the resistance 186 that is included between the winding 126 and resistor 184.

It will, of course, be appreciated that the acceleration rate which is determined by the position of the controller 6 is maintained only until all of the resistor 9 is excluded from the motor circuit, thereafter the acceleration rate diminishes as the motors reach their full speed. When the train speed is above the value at which the motors can sustain their selected acceleration, the voltage between the train wires 87 and 88 increases to the full value of the battery 164 and the control pipe 3 is vented.

While one embodiment of my invention has been illustrated and described, it will be apparent to those skilled in the art that many modifications in the apparatus and circuits illustrated may be made without departing from the spirit of my invention, and I do not wish to be limited otherwise than by the scope of the appended claims.

Having now described my invention, what I claim as new and desire to secure by Letters Patent, is:

1. In a propulsion and braking equipment for vehicles, in combination, propulsion means for the vehicle, braking means for the vehicle, means for controlling said propulsion means and said braking means including an electric train circuit and means for controlling the voltage thereof to normally maintain a predetermined voltage corresponding to the idling of said propulsion means and the release of said brake means, and means for varying the voltage in one direction from said predetermined value to effect an application of the brakes and in the other direction from said predetermined value to effect the propulsion of the vehicle.

2. In a propulsion and braking equipment for vehicles, in combination, propulsion means for the vehicle, braking means for the vehicle, means for controlling said propulsion and braking means including an electric train circuit and means for controlling the voltage thereof to maintain a predetermined voltage corresponding to the idling of said propulsion means and the release of said braking means, means for controlling the retardation of the vehicle in accordance with the amount of variation in voltage from said predetermined value in one direction, and means for controlling the acceleration of the vehicle in accordance with the amount of variation in voltage from said predetermined value in the other direction.

3. In a propulsion and braking equipment for vehicles, in combination, propulsion means for the vehicle, braking means for the vehicle, means for controlling said propulsion and braking means including an electric train circuit and means for controlling the voltage thereof to maintain a predetermined voltage corresponding to the idling of said propulsion means and the release of said braking means, manually operable means for varying the voltage in the one or the other direction from said predetermined value to effect an application of the brakes or an acceleration of the vehicle, and means for controlling the acceleration or deceleration of the vehicle in accordance with the amount of movement of said manually operable means from its idling or release position.

4. In a propulsion and braking equipment for vehicles, in combination, propulsion means for the vehicle, braking means for the vehicle, means for controlling said propulsion means and said braking means including an electric train circuit and means for controlling the voltage thereof to maintain a predetermined voltage corresponding to the idling of said propulsion means and the release of said braking means, manually operable means for effecting a voltage on said train circuit that is higher or lower than said predetermined voltage, means responsive to the degree of variation in said voltage from said predetermined value to effect a corresponding degree of application of the brakes upon a decrease in voltage and to effect the corresponding acceleration of the vehicle upon an increase in voltage from said predetermined value, and means responsive to the change in the speed of the vehicle for controlling the amount of variation in the voltage from said predetermined value in accordance with the amount of movement of said manually operable means from said idling or release position.

5. In a braking equipment for vehicles, in combination, a plurality of braking means, means for controlling said braking means including an electric train circuit and means for controlling the voltage thereof to normally maintain a predetermined voltage corresponding to the release position of said braking means, manually controlled means for effecting a reduction in voltage below the predetermined amount corresponding to the desired degree of braking, means for controlling the operation of one of said braking means in accordance with the reduction in voltage below the predetermined value over a predetermined voltage range, and means responsive to a predetermined reduction in the voltage beyond said voltage range for effecting the application of another of said braking means.

6. In a brake equipment for vehicles, in combination, a plurality of braking means, a train electric circuit normally maintained at a predetermined voltage, means for effecting a reduction in voltage below said predetermined value to effect the application of one of said brakes, means responsive to the braking force for controlling the voltage in said train circuit to effect the desired retardation of the vehicle, means responsive to a predetermined voltage range for controlling the degree of application of one of the braking means upon a continuing reduction in voltage in said train circuit, and means responsive to a predetermined reduction in voltage to effect the application of another of said braking means.

7. In a brake equipment for vehicles, in combination, an electric braking means for developing a braking torque on the vehicle wheels, a fluid pressure braking means, a train electric circuit normally maintained at a predetermined voltage, manually operated means for effecting a reduction in the voltage below said predetermined value to effect the application of one of said braking means, means responsive to the braking force for controlling the voltage in said train line circuit to effect a desired retardation in the vehicle in accordance with the amount of movement of said manually operable means from release position, means responsive over a predetermined range below said predetermined value for controlling the degree of application of said electric braking means, and means responsive to a further reduction in said voltage for effecting the application of said fluid pressure braking means.

8. In a brake equipment for vehicles, in combination, an electric braking means for developing a braking torque on the vehicle wheels, a fluid pressure braking means, a train electric circuit normally maintained at a predetermined voltage, manually operated means for effecting a reduction in voltage below said predetermined value to effect an application of the brakes, means responsive to the braking force for controlling the voltage in said train circuit to effect a desired retardation of the vehicle in accordance with the amount of movement of said manually operable means from release position, means responsive to a predetermined voltage range below said predetermined value for controlling the degree of application of said electric braking means, and means responsive to a further reduction in said voltage for effecting the application of the fluid pressure braking means and responsive to said voltage for controlling the degree of application of said fluid pressure braking means in accordance with the variation in voltage below said predetermined value.

9. In a brake equipment for vehicles, in combination, an electric braking means for developing a braking torque on the vehicle wheels, a fluid pressure braking means, a train circuit, a manually operable brake controller, electrically controlled voltage regulating means operative when the brake controller is in release position for maintaining a predetermined voltage on said train circuit, means operated in accordance with the reduction in voltage in said train circuit below said predetermined voltage for controlling said electrical braking means, and a relay valve device operative to control said fluid pressure braking means upon a predetermined reduction in the voltage in said train circuit below said predetermined value.

10. In a propulsion and braking equipment for vehicles, in combination, propulsion means for the vehicle, braking means for the vehicle, automatic means for controlling the supply of fluid under pressure to develop a predetermined pressure corresponding to the idling of said propulsion means and the release of said braking means, manually operable means for effecting the development of pressure that is lower or higher than said predetermined pressure, means responsive to the degree of variation in pressure from said predetermined value to effect a corresponding degree of application of the brakes upon an increase in pressure and to effect a corresponding acceleration of the vehicle upon a decrease of pressure from said predetermined value, and means responsive to the change in the speed of the vehicle for controlling the amount of variation in the developed pressure from said predetermined value in accordance with the amount of movement of said manually operable means from its idling or release position.

11. In a braking equipment for vehicles, in combination, a plurality of braking means, automatic means for controlling the supply of fluid under pressure to develop a predetermined pressure corresponding to the release of the braking means, manually controlled means for effecting an increase in pressure above the predetermined value an amount corresponding to the desired degree of braking, means for effecting the operation of one of said braking means in accordance with the amount of increase in pressure above the predetermined value over a predetermined pressure range, and means responsive to a further predetermined increase in the pressure beyond said pressure range for effecting the application of another of said braking means.

12. In a brake equipment for vehicles, in combination, a plurality of braking means, a pipe normally charged with fluid under pressure to a predetermined pressure, means for effecting an increase in pressure above said predetermined value to effect the application of one of said braking means, means responsive to the braking force for controlling the pressure in said pipe to effect a desired rate of retardation of the vehicle, means responsive to a predetermined pressure range for controlling the degree of application of one of the braking means upon a continuing increase in pressure in said pipe, and means responsive to a further predetermined increase in pressure to effect the application of the other of said braking means.

13. In a brake equipment for vehicles, in combination, an electric braking means for developing a braking torque on the vehicle wheels, a fluid pressure braking means, a pipe normally charged with fluid under pressure to a predetermined value, manually operable means for effecting an increase in the pressure above said predetermined value to effect the application of one of said braking means, means responsive to the braking force for controlling the pressure in said pipe to effect a desired retardation of the vehicle in accordance with the amount of movement of said manually operable means from its release position, means responsive over a predetermined pressure range above said predetermined value for controlling the degree of application of said electric braking means, and means responsive to a further increase in said pressure for effecting the application of said fluid pressure braking means.

14. In a propulsion and brake equipment for vehicles, in combination, electric driving motors for the vehicle, an electric train circuit, automatic means for regulating the voltage of said train circuit to normally maintain a predetermined constant voltage thereon, manually operable means for effecting an increase or decrease of voltage in said train circuit above or below said predetermined value, a pressure operated motor controller device including a rheostat for controlling said motors and an abutment operatively connected thereto and controlled in accordance with variations in the voltage in said train circuit, said controller device being so arranged as to maintain said rheostat in its all-in position when the voltage in said train circuit is maintained at said predetermined value, and subject on an increase in voltage above said predetermined value to actuate said rheostat toward its all-out position to control the supply of power to said motors, and subject upon a decrease in voltage below said predetermined value to actuate said rheostat toward its all-out position to control the flow of dynamic braking current from said motors.

15. In a propulsion and braking equipment for vehicles, in combination, electric driving motors for the vehicle, an electric train circuit, automatic means for regulating the voltage of said train circuit to maintain a predetermined constant voltage thereon, manually operable means for effecting an increase or decrease in the voltage of said train circuit above or below said predetermined value, a self-lapping magnet valve device responsive to the voltage in said train circuit for controlling the supply of fluid under pressure to develop a pressure that varies inversely with said voltage, a pressure operated motor controller device responsive to said developed pressure and including a rheostat for controlling said motors and an abutment operatively connected thereto and subject on one side to said developed pressure, said controller device being so arranged as to maintain said rheostat in its all-in position when the developed pressure is maintained at a value corresponding to said predetermined voltage, and subject upon a decrease in pressure below said value to actuate said rheostat toward its all-out position to control the supply of power to said motors, and subject upon an increase in pressure above said value to actuate said rheostat toward its all-out position to control the flow of dynamic braking current from said motor.

16. In a propulsion and braking equipment for vehicles, in combination, electric driving motors for the vehicles, an electric train circuit, regulating means normally responsive to train circuit voltage for maintaining a constant predetermined voltage on said train circuit, manually operable means for connecting said regulating means to operate in response to the current flowing through said motors to maintain a constant current therethrough the value of which is dependent upon the amount of movement of said manually operable means from its idling position and to effect an increase in train circuit voltage upon a decrease in said current below said constant value when the manually operable means is moved in one direction from its idling position and a decrease in the train circuit voltage upon an increase in said current above said constant value when the manually operable means is moved to the other direction from its idling position, a motor controller device responsive to the voltage of said train circuit and subject upon an increase in voltage above said predetermined value to effect the supply of power to said motors, and subject upon a decrease in voltage below said predetermined value to effect the flow of dynamic braking current from said motors.

17. In a propulsion and braking equipment for vehicles, in combination, electric driving motors for the vehicle, an electric train circuit, regulating means normally responsive to train circuit voltage for maintaining a constant predetermined voltage on said train circuit, manually operable means for connecting said regulating means to operate in response to the current flowing through said motors to maintain a constant current therethrough the value of which is dependent upon the amount of movement of said manually operable means from its idling position and to effect an increase in said train circuit voltage upon a decrease in said current below said constant value when the manually operable means is moved in one direction from its idling position and a decrease in train circuit voltage upon an increase in said current above said constant value when the manually operable means is moved in the other direction from its idling position, a pressure operated motor controller device including a rheostat for controlling said motors and an abutment operatively connected thereto and subject on one side to the pressure controlled by the voltage in said train circuit, said controller device being so arranged as to maintain said rheostat in its all-in position when the voltage in said train circuit is maintained at said predetermined value, and subject upon an increase in pressure above said value to actuate said rheostat toward its all-out position to control the supply of power to said motors, and subject upon a decrease in voltage below said value to actuate said rheostat toward its all-out position to control the flow of dynamic braking current from said motors.

18. In a propulsion and braking equipment for vehicles, in combination, electric driving motors for the vehicle, an electric train circuit, regulating means normally responsive to train circuit voltage for maintaining a constant predetermined voltage on said train circuit, manually operable means for controlling said regulating means to operate in response to the current flowing through said motors to maintain a constant current therethrough the value of which is dependent on the amount of movement of said manually operable means from its idling position and to effect the increase in train circuit voltage upon a decrease in said current below said constant value when the manually operable means is moved in one direction from its idling position and a decrease in train circuit voltage upon an increase in said current above said constant value when the manually operable means is moved in the other direction from its idling position, a pressure operated motor controller device including a rheostat for controlling said motors and an abutment operatively connected thereto and subject on one side to pressure controlled by the voltage in said train circuit, said controller device being so arranged as to maintain said rheostat in its all-in position when the pressure in said train circuit is maintained at said predetermined value, and subject upon a decrease in pressure below said value to actuate said rheostat toward its all-out position to control the supply of power to said motors, and subject upon an increase in pressure above said value to actuate said rheostat toward its all-out position to control the flow of dynamic braking current from said motor.

19. In a propulsion and braking equipment for vehicles, in combination, a brake cylinder, electric driving motors for a vehicle, an electric train circuit, regulating means normally connected to respond to train circuit voltage for maintaining a constant predetermined voltage on said train circuit, manually operable means for connecting said regulating means to operate in response to the current flowing through said motors to maintain a substantially constant current therethrough the value of which is dependent upon the amount of movement of said manually operable means from its idling position and to effect an increase in said train circuit voltage upon a decrease in said current below said predetermined value when the manually operable means is moved in one direction from its idling position and a decrease in said train line voltage upon an increase in said current above said constant value when the manually operable means is moved in the other direction from its idling position, a motor controller device responsive to the voltage of said train line circuit and subject on an increase in voltage above said predetermined value to effect the supply of power to said motors, and subject upon a decrease in voltage below said predetermined value to effect the flow of dynamic braking current from said motors, and means responsive after a predetermined decrease in train line voltage for effecting the supply of fluid under pressure to said brake cylinder to effect an increase in brake cylinder pressure in accordance with the further decrease in said voltage.

20. In a vehicle control system, in combination, propulsion means for the vehicle, braking means for the vehicle, an electric circuit, means for connecting said electric circuit to a source of current supply of substantially invariable voltage and for maintaining the voltage of said circuit at a substantially constant value, means responsive to a variation in the voltage of said circuit above and below said constant value for controlling respectively said braking means and said propulsion means, and means for connecting said last mentioned means to a source of current supply of variable voltage for controlling the operation thereof.

21. In a vehicle control system, in combination, vehicle drive motors, fluid pressure brake means, a circuit, means for energizing said circuit and for maintaining it energized at a substantially constant voltage, means for varying said voltage above or below said constant value, means responsive to the variation of said voltage above said constant value for supplying electric power to said motors to propel the vehicle, and responsive to the variation of said voltage below said constant value for connecting said drive motors in a dynamic braking circuit to produce a braking effect on the vehicle, and means responsive to a predetermined reduction in said voltage for effecting an application of said fluid pressure brake means.

22. In a vehicle brake system, in combination, vehicle drive motors, a circuit adapted to have the voltage thereof maintained substantially constant, and to be varied to control the operation of said drive motors, means responsive to a variation of said voltage from said constant value for connecting said drive motors in a dynamic braking circuit in which current flows to produce a braking effect on the vehicle, and means controlled by the current in said circuit for controlling the variation of the voltage of said circuit.

23. In a vehicle brake system, in combination, vehicle drive motors, a circuit, means for supplying current to said circuit and for maintaining the voltage thereof at a substantially constant value, and for varying the voltage from said constant value when effecting an application of the brakes, means responsive to said variation of voltage from said constant value for connecting said vehicle drive motors in a dynamic braking circuit to produce a braking effect on the vehicle.

24. In a vehicle control system, in combination, vehicle drive motors, a circuit, means for supplying current to said circuit and for maintaining the voltage thereof at a substantially constant value, means for varying the voltage from said constant value, and means responsive to said variation of voltage for connecting said drive motors to a source of electric power supply to propel the vehicle.

25. In a vehicle control system, in combination, vehicle drive motors, a circuit, means for energizing said circuit at a substantially constant voltage, and for varying the voltage thereof to control the operation of said drive motors, control means responsive to the variation of said voltage for effecting a supply of electric power to said drive motors to propel the vehicle, and means governed by the degree of current supplied to said motors for controlling the said variation of said voltage.

26. In a vehicle control system, in combination, vehicle drive motors, a circuit, means for energizing said circuit at a substantially constant voltage and for varying the voltage of said circuit, means operative upon a variation of the voltage of said circuit for supplying electric current to said motors to effect the propulsion of said vehicle, and means governed by the current supplied to said motors for controlling the variation of the voltage of said circuit.

27. A vehicle brake system comprising braking means, a circuit, electroresponsive means normally effective to regulate the voltage on said circuit to a substantially constant voltage, manually controlled means for rendering said electroresponsive means operative to vary the voltage on said circuit, means operatively controlled by variation from said normal voltage on said circuit for effecting application of the braking means, and means governed by the intensity of application of the braking means for controlling operation of the electroresponsive means to vary the voltage on said circuit.

28. A vehicle brake system comprising braking means, a circuit, electroresponsive means effective normally to cause energization of said circuit and to regulate the voltage thereon to a substantially constant value and operatively effective at another time to vary the voltage on said circuit from said normal voltage, manually controlled means for rendering said electroresponsive means operatively effective to vary the voltage on said circuit from said normal voltage, means operative in response to the normal voltage on said circuit for causing release of said braking means and in response to a variation from said normal voltage to cause application of the braking means, and means governed by the intensity of the brake application for controlling the operation of the electroresponsive means to vary the voltage on said circuit.

29. A vehicle brake system comprising braking means, an electrical circuit, a source of substantially constant voltage, a source of varying voltage, manually controlled means normally effective to cause energization of said circuit from said substantially constant voltage source and operative to render said circuit energizable from said varying voltage source, and means operating on said circuit effective when the circuit is energized from said constant voltage source to effect release of the braking means and when the circuit is energized from said varying voltage source to effect application of the braking means.

30. A vehicle brake and propulsion system comprising vehicle propulsion means, vehicle braking means, a circuit on the vehicle, means normally energizing said circuit at a certain normal substantially constant impressed voltage, means for increasing or decreasing the voltage impressed on said circuit above or below said normal voltage, and means operatively responsive to the reduction from the normal voltage on said circuit for controlling the operation of the braking means and operatively responsive to an increase from the normal voltage from said circuit for controlling the operation of the propulsion means.

JOHN W. LOGAN, Jr.